United States Patent
Lusinchi (10) Patent No.: US 8,090,250 B2
(45) Date of Patent: Jan. 3, 2012

(54) IMAGING DEVICE WITH FOCUS OFFSET COMPENSATION

(75) Inventor: Jean-Pierre Lusinchi, Suzhou (CN)

(73) Assignee: Ether Precision, Inc. (KY)

( * ) Notice: Subject to any disclaimer, the term of this patent is extended or adjusted under 35 U.S.C. 154(b) by 0 days.

(21) Appl. No.: 12/490,297

(22) Filed: Jun. 23, 2009

(65) Prior Publication Data

US 2010/0322610 A1    Dec. 23, 2010

(51) Int. Cl.
*G03B 3/00* (2006.01)
*G03B 17/00* (2006.01)

(52) U.S. Cl. .............. 396/89; 396/439; 396/529

(58) Field of Classification Search .......... 396/89, 396/439, 529
See application file for complete search history.

(56) References Cited

U.S. PATENT DOCUMENTS

| | | | |
|---|---|---|---|
| 4,411,490 A | 10/1983 | Daniel | |
| 4,416,513 A | 11/1983 | Uesugi | |
| 4,432,022 A | 2/1984 | Tokumitsu | |
| 4,473,284 A | 9/1984 | Hiramatsu et al. | |
| 4,583,126 A | 4/1986 | Stoffel | |
| 5,399,850 A | 3/1995 | Nagatani et al. | |
| 5,444,520 A | 8/1995 | Murano | |
| 5,570,231 A | 10/1996 | Mogamiya | |
| 5,617,131 A | 4/1997 | Murano et al. | |
| 5,661,540 A | 8/1997 | Kaihotsu et al. | |
| 5,699,200 A | 12/1997 | Uno et al. | |
| 6,002,459 A | 12/1999 | Kaise et al. | |
| 6,449,106 B1 | 9/2002 | Spinali | |
| 6,665,455 B1 | 12/2003 | Ting | |
| 6,683,298 B1 | 1/2004 | Chang et al. | |
| 6,747,805 B2 | 6/2004 | Sayag | |
| 6,809,868 B2 | 10/2004 | Ogi et al. | |
| 6,822,803 B2 | 11/2004 | Muto et al. | |
| 6,917,757 B1 | 7/2005 | Chang | |
| 7,112,864 B2 | 9/2006 | Tsukamoto et al. | |
| 7,116,484 B2 | 10/2006 | Nemoto et al. | |
| 7,158,170 B2 | 1/2007 | Gustavsson et al. | |
| 7,158,316 B2 | 1/2007 | Chang et al. | |
| 7,166,907 B2 | 1/2007 | Onishi et al. | |
| 7,177,082 B2 | 2/2007 | Wakisaka et al. | |

(Continued)

FOREIGN PATENT DOCUMENTS

TW    095142246    11/2006

(Continued)

OTHER PUBLICATIONS

Cardinal point (optics), Wikipedia, http://en.wikipedia.org/wiki/Cardinal_point_(optics), Jan. 18, 2011.*

(Continued)

*Primary Examiner* — Rodney Fuller
(74) *Attorney, Agent, or Firm* — Janah & Associates, P.C.; Ashok K. Janah (57) ABSTRACT

An imaging device comprises a lens barrel having a lens opening, and a lens positioned in the lens opening of the lens barrel, the lens having an optical center, a focal length F, an aperture diameter D, and an aperture number $F_N=F/D$. An image sensor comprises an array of light sensing pixels that each have a dimension P, the sensor spaced apart a distance S from the optical center of the lens such that a focus offset gap X=F−S. The pixel dimension P and aperture number $F_N$ are selected such that $2 \cdot P \cdot F_N \geq X$.

17 Claims, 5 Drawing Sheets

U.S. PATENT DOCUMENTS

| | | | |
|---|---|---|---|
| 7,187,501 B2 | 3/2007 | Wakisaka | |
| 7,199,359 B2 * | 4/2007 | Webster | 250/239 |
| 7,215,479 B1 | 5/2007 | Bakin | |
| 7,262,927 B1 | 8/2007 | Shyu et al. | |
| 7,330,211 B2 * | 2/2008 | Vook et al. | 348/340 |
| 7,338,159 B2 | 3/2008 | Spivey | |
| 7,352,511 B2 | 4/2008 | Boettiger et al. | |
| 7,360,422 B2 | 4/2008 | Madni et al. | |
| 7,375,893 B2 | 5/2008 | Toyoda | |
| 7,379,113 B2 * | 5/2008 | Kong et al. | 348/340 |
| 7,411,749 B2 | 8/2008 | Liu | |
| 7,545,588 B2 | 6/2009 | Hua | |
| 2002/0071190 A1 | 6/2002 | Wada et al. | |
| 2002/0144905 A1 | 10/2002 | Schmidt | |
| 2004/0061799 A1 | 4/2004 | Atarashi et al. | |
| 2004/0095502 A1 | 5/2004 | Losehand et al. | |
| 2004/0109079 A1 * | 6/2004 | Fujimoto et al. | 348/340 |
| 2004/0227848 A1 | 11/2004 | Tan et al. | |
| 2005/0041098 A1 | 2/2005 | Tan et al. | |
| 2005/0162538 A1 | 7/2005 | Kurosawa | |
| 2005/0275741 A1 | 12/2005 | Watanabe et al. | |
| 2006/0035415 A1 | 2/2006 | Wood et al. | |
| 2006/0043262 A1 | 3/2006 | Akram | |
| 2006/0171047 A1 | 8/2006 | Yen et al. | |
| 2006/0179887 A1 | 8/2006 | Lung et al. | |
| 2006/0252246 A1 | 11/2006 | Paik et al. | |
| 2007/0045517 A1 | 3/2007 | Fukuyoshi et al. | |
| 2007/0069108 A1 | 3/2007 | Inaba | |
| 2007/0139795 A1 | 6/2007 | Li | |
| 2007/0186589 A1 | 8/2007 | Lung | |
| 2007/0296847 A1 | 12/2007 | Chang et al. | |
| 2008/0115880 A1 | 5/2008 | Chang | |
| 2008/0121784 A1 | 5/2008 | Chang et al. | |
| 2008/0158698 A1 | 7/2008 | Chang et al. | |
| 2008/0309812 A1 * | 12/2008 | Chen et al. | 348/340 |
| 2009/0116096 A1 * | 5/2009 | Zalevsky et al. | 359/256 |

FOREIGN PATENT DOCUMENTS

| | | |
|---|---|---|
| TW | 095223188 | 12/2006 |
| TW | 096116333 | 5/2007 |
| TW | 096122374 | 6/2007 |
| WO | WO 03009040 A1 | 1/2003 |
| WO | WO 2007014293 A1 | 2/2007 |

OTHER PUBLICATIONS

USPTO Final Office Action Dated Mar. 6, 2009 in U.S. Appl. No. 11/769,805 (US 2008-0158698 A1).

USPTO Office Action Dated Sep. 2, 2008 in Appl. No. 11/769,805 (US 2008-0158698 A1).

USPTO Office Action Dated Jun. 10, 2009 in U.S. Appl. No. 11/640,249 (US 2008-0115880 A1).

USPTO Office Action Dated Aug. 28, 2008 in U.S. Appl. No. 11/640,257 (issued as US 7,545,588).

Lusinchi et al., U.S. Appl. No. 12/228,698 (unpublished), entitled "Lens assembly and method of manufacture", filed Aug. 15, 2008.

USPTO Office Action dated Feb. 23, 2009 in U.S. Appl. No. 11/925,742 (US 2008/0121784 A1).

PCT International Search Report and Written Opinion from PCT Appl. No. PCT/CN2010/000918, Oct. 21, 2010, Beijing, China.

USPTO Office Action dated Nov. 9, 2007 in U.S. Appl. No. 11/703,840 (US 7411749).

USPTO Office Action dated Jan. 7, 2010 in U.S. Appl. No. 11/774,646.

Kunnavakkam, et al., "Low-cost, low-loss microlens arrays fabricated by soft-lithography replication process", Applied Physics Letters, vol. 82, No. 8. pp. 1152-1154, Feb. 2003.

USPTO Office Action dated Nov. 27, 2009 in U.S. Appl. No. 11/925,742 (US 2008/0121784 A1).

* cited by examiner

IMAGING DEVICE WITH FOCUS OFFSET COMPENSATION

BACKGROUND

Embodiments of the present invention relate to an imaging device for forming an image on an image sensor.

Figure 1:
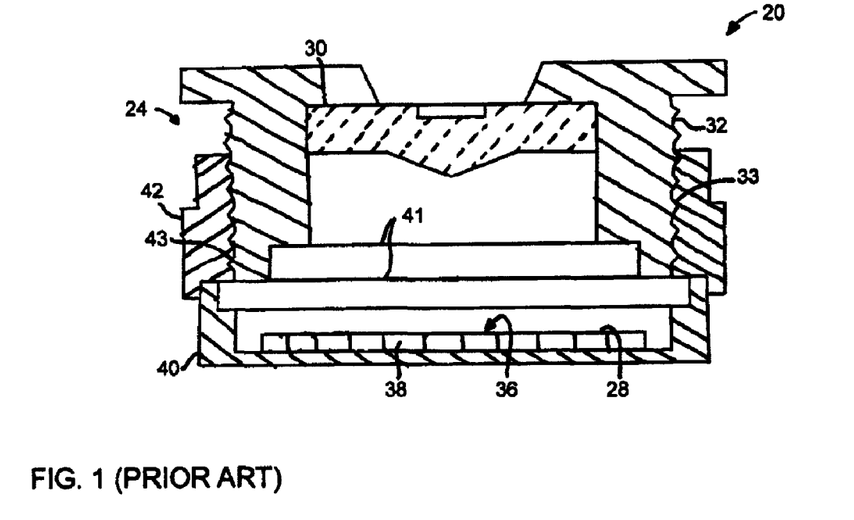
FIG. 1 (PRIOR ART) is a schematic sectional side view of a conventional imaging device comprising a lens module attached to an image sensor.

An imaging device 20 comprises a lens module 24 which directs an image onto an image sensor 28, as for example shown in FIG. 1. The lens module 24 comprises a lens 30 mounted in a lens barrel 32, the exterior surface of which comprises a screw thread 33. The image sensor 28 can be, for example, a CCD or CMOS array having an image receiving surface 36 comprising imaging pixels 38 which convert an incident image of light, infra-red or other radiation, into an electric signal. Typically, the image sensor 28 is enclosed in a package 40 which can include one or more cover plates 41, which are transparent to light and protect the image sensor 28. A holder 42 comprising an interior screw thread 43 joins and aligns the lens 30 in the lens module 24 to the image sensor 28 in the package 40. The imaging device 20 is used in, for example, electronic devices such as mobile phones, personal digital assistants, remote sensors, signal transmitting cameras, medical devices, and applications such as lenses for car security systems.

As such imaging devices 20 are developed to have smaller sizes, it becomes increasingly difficult to properly position and align the ever smaller lenses 30 to the plane of the image receiving surface 36 of the image sensor 28. For example, it can be difficult to align the axis of a lens 30 to be parallel to the central axis of a lens barrel 32 during assembly of the lens module 24. Even a slight degree of misalignment will cause the image generated by a lens 30 to become unfocused. Also, the lens 30 has to be at a particular height above the image sensor 28 to provide a properly focused image on the sensor 28. During focus testing, the spacing between the lens 30 and image sensor 28 is changed by adjusting the height of the lens barrel 32 having a screw thread 33 inside the lens holder 42. However, the screw threads 33 and 43 have to be very accurate to provide sufficiently small incremental height adjustments, which may be as small as 1 micron, without un-centering the lens 30 or causing the lens 30 to tilt. The focus testing and height adjustment step increases assembly costs and can result in assembly defects and lower device yields.

For various reasons that include these and other deficiencies, and despite the development of various imaging devices, further improvements in imaging device design and assembly are continuously being sought.

SUMMARY

An imaging device comprises a lens barrel having a lens opening, and a lens positioned in the lens opening of the lens barrel, the lens having an optical center, a focal length F, an aperture diameter D, and an aperture number $F_N=F/D$. An image sensor comprises an array of light sensing pixels that each have a dimension P. The image sensor is spaced apart a distance S from the optical center of the lens such that a focus offset gap $X=F-S$. The pixel dimension P and aperture number $F_N$ are selected such that $2 \cdot P \cdot F_N \geq X$.

A method of forming an imaging device comprises providing a lens barrel having a lens opening and positioning a lens in the lens opening of the lens barrel, the lens having a focal length F, an aperture diameter D, and an aperture number $F_N=F/D$. An image sensor is placed at a distance S from the optical center of the lens such that a focus offset gap $X=F-S$, the sensor comprising an array of light-sensing pixels that each have a dimension P. The dimension P of the light-sensing pixels and the aperture number $F_N$ of the lens are selected so that $2 \cdot P \cdot F_N \geq X$.

DRAWINGS

These features, aspects, and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

DESCRIPTION

Figure 2:
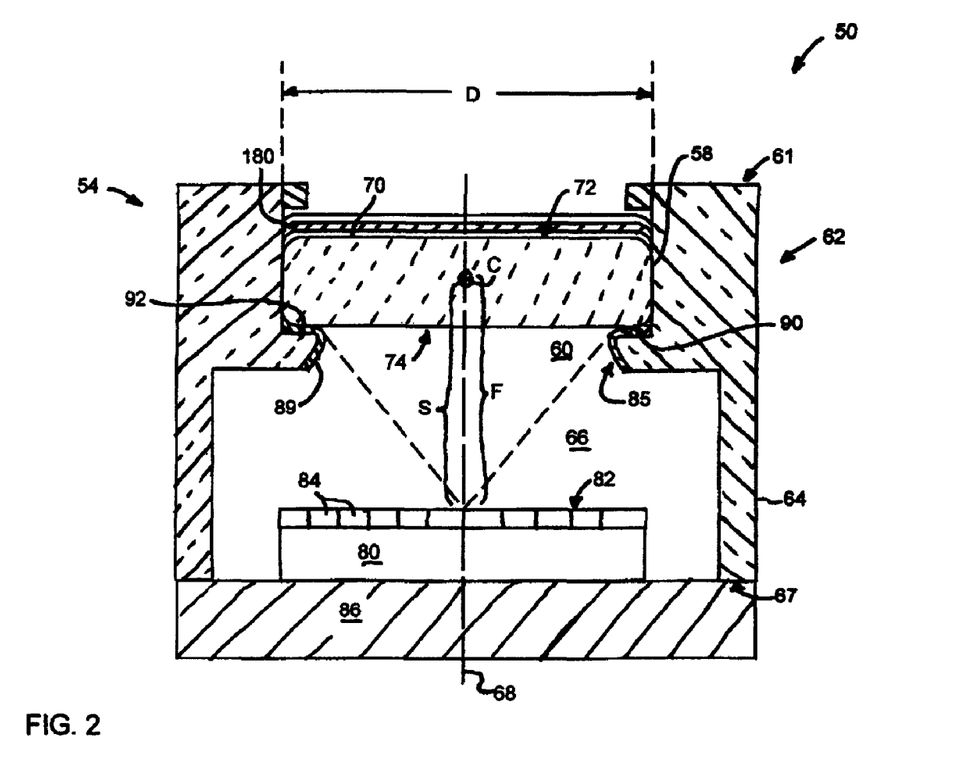
FIG. 2 is a schematic sectional side view of an imaging device comprising a lens module aligned to an image sensor.

An embodiment of an imaging device 50 comprises a lens module 54 that includes a lens 58 (or an assembly of lenses) positioned in a lens opening 60 of a lens barrel 62, as shown in FIG. 2. The lens opening 60 extends inward and downward from a first surface 61 of a spacer plate 64, and an image sensor cavity 66 extends inward and upward from a second surface 67 that opposes the first surface 61. The lens barrel 62 surrounds the lens opening 60 and sensor cavity 66 and has a common central axis 68. While an exemplary embodiment of a lens barrel 62 having a cylindrical axis of symmetry, such as the axis 68, is described herein to illustrate the present structures and processes, it should be understood that other lens barrel configurations can also be used. For example, the lens barrel 62 can be rectangular, spherical, or even conical shaped.

The lens 58 (or one or more of the lenses) is made of an optically transparent material, such as glass, polymer, or other materials. In one method, the lens 58 is made of glass, which is molded into a suitable shape. The glass lenses are typically more stable at high temperature environments than plastic lenses. The lens 58 can be made from high purity glass, but can also be made from other optical materials, such as epoxy or polycarbonate. The lens 58 can also have an antireflective coating 70 which improves the light transmission, as it is well known in the state of the art. The antireflective coating 70 can be provided on a top surface 72 of the lens 58, and can also be formed on a bottom surface 74 of the lens 58 (not shown) to reduce or prevent back reflections from surrounding surfaces. The bottom surface 74 can be coated with an infrared filter (not shown). In one version, this infrared filter comprises successive layers of metal oxide that form an interferometric filter that filters light that is reflected onto the lens 58.

The lens 58 has an optical center C, which is a point on the axis 68 of the central lens 58 at which the incident portion of an incident light ray passing through this point and the emergent portion of the same light ray, are parallel. The lens 58 also has a focal length F, which is the distance from the optical center C of the lens 58 to the principal focal point of the lens. For example, a converging lens, such as a convex lens, has a focal length which is positive and is the distance at which a beam of collimated light will be focused to a single spot.

The lens 58 also has an aperture diameter D which is the diameter of the aperture. The aperture, also called the "entrance pupil", allows light to be admitted to the lens 58, and determines the cone angle of a bundle of rays that come to a focus in the image plane of the sensor. For example, when the lens 58 is composed of several elements, such as a plurality of lenses 58, the entrance pupil may be defined by an opaque material inserted between two of the elements (such as a sheet or coating) which has an opening sized to allow certain amount of light to pass through the lens. When the lens is composed of only one element, as shown in FIG. 2, the front opening defines the entrance pupil, and is the aperture. The aperture diameter also determines how many of the incoming rays are actually admitted, and thus, the amount of light that reaches the image plane. A suitable range of aperture diameters D is from about 0.5 to about 10 mm.

The aperture number $F_N$ of the lens 58 (also known as the focal ratio, f-ratio, or relative aperture) expresses the aperture diameter in relation to the focal length of the lens 58. In simpler terms, the aperture number is the focal length F divided by the aperture diameter D. The aperture number $F_N$ is a dimensionless number of the lens 58 and can be calculated by the formula $F_N=F/D$. For example, if the focal length is 16 times the aperture diameter, the aperture number is F/16, or $F_N=16$. A suitable range of $F_N$ is from about 1 to about 22, and a smaller range would be from about 1.4 to about 3.2. For such aperture numbers, the lens 58 can have a focal length of from about 0.5 mm to about 10 mm, or even from about 1 mm to about 5 mm.

An image sensor 80 comprises an image receiving surface 82 comprising an array of light-sensing pixels 84 that each has a dimension P. The pixels 84 are spaced apart and arranged in a periodic arrangement. The image receiving surface 82 receives a portion of the focused image from the lens 58 (or group of lenses), and converts the received image to an electrical signal trace for further processing. The image receiving surface 82 is aligned directly to the lens 58 as shown in FIG. 2. The image sensor 80 is mounted on a sensor substrate 86 can be a printed circuit board or a semiconductor wafer, such as a silicon wafer or compound semiconductor, such as gallium arsenide. Typically, the image sensor 80 is enclosed in a package (not shown), and can be fabricated by conventional chip on board (COB), tape carrier package (TCP), chip on glass (COG), or chip scale package (CSP) methods either with lateral connections or realized in a Through Silicon Via (TSV) technology.

The image receiving surface 82 of the image sensor 80 is spaced apart a distance S from the optical center C of the lens 58. The distance S can vary depending on the height of the optical center of the lens 58. For example, the optical center of the lens 58 can be at a greater distance S from the image receiving surface 82 due to variations in the height of the spacer plate 64, the thickness of the lens 58, or even the thickness of spacers or adhesives used between the lens and the support structure such as the spacer plate 64. They can also arise from variations in the depth or diameter of the opening 60 used to seat the lens 58 in the spacer plate 64. Such variations can also result from conventional machining tolerances.

The focus offset gap X is given by the difference between the focal length F and the distance S, such that X=F−S. The focus offset gap X is a measure of the difference in spacing from the ideal situation where F is exactly equal to S, and consequently X=0, as shown in FIG. 2. More often, X has a finite positive or negative value. For example, X has a positive value when F is greater than S; conversely, X has a negative value when F is less than S. In conventional imaging systems, the image formed on the image receiving surface 82 of the image sensor 80 is out of focus when X is not zero. The focus offset gap can arise from distances that result as an accumulation of various machining tolerances for the lens module 54, lens barrel 62, spacer plate 64, sensor substrate 86, and other such components. The focus offset gap can also result from additional distances introduced by the thickness of adhesives or other spacers.

Figure 3A:
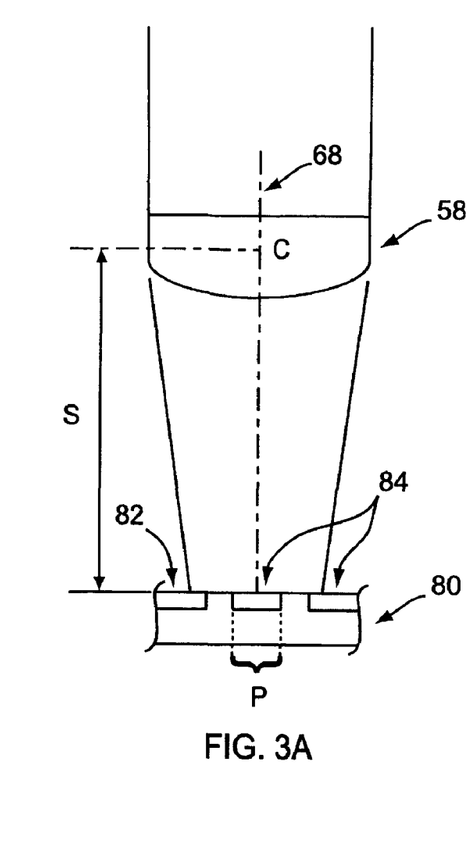
FIGS. 3A to 3C are schematic sectional side views of an imaging device having light rays that converge (i) as an unfocused image when $2 \cdot P \cdot F_N$ is less than X (FIG. 3A); (ii) as a focused image within a pixel dimension when $2 \cdot P \cdot F_N$ is greater than X (FIG. 3B), and (iii) as a focused image when X is equal to zero (FIG. 3C)
Figure 3B:
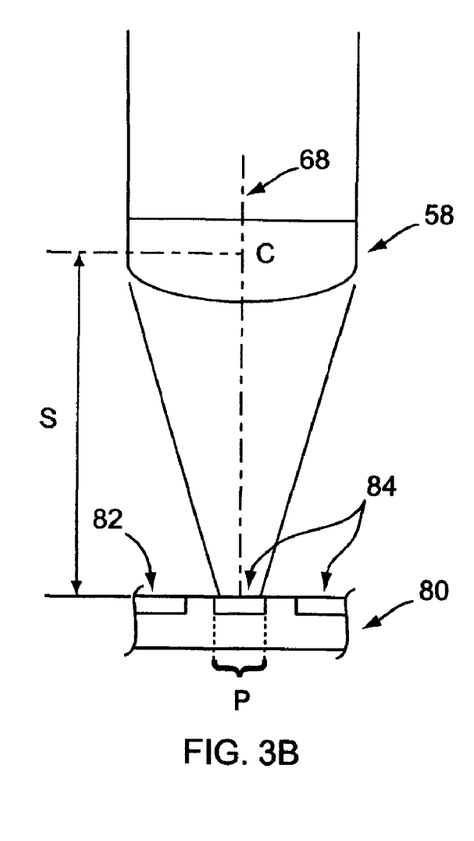
Figure 3C:
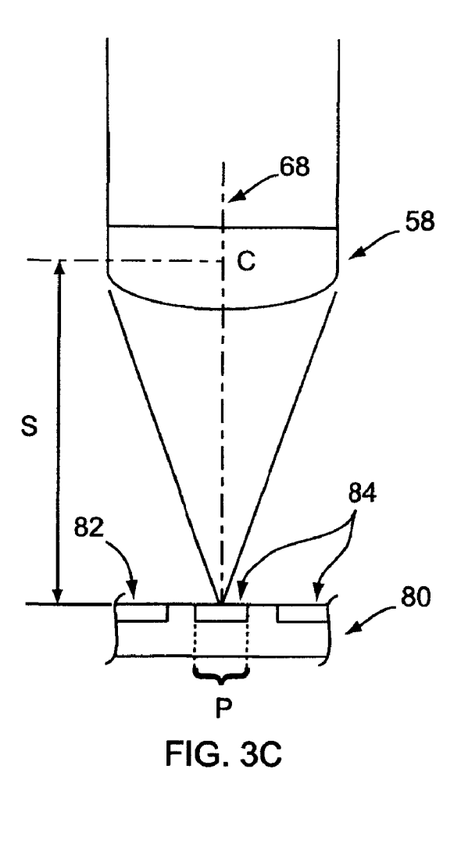

It has been discovered that an imaging device 50 can be designed to reduce or eliminate the focusing error caused by focus offset gap X having a positive or negative value. In this method, the dimension or size P of each pixel of the image sensor 80 is selected in relation to the aperture number $F_N$ such that $2 \cdot P \cdot F_N \geq X$. The three situations, which demonstrate the optics of this system, are shown in FIGS. 3A-C. For example, FIG. 3A shows the situation when $2 \cdot P \cdot F_N$ is less than (<) the focus offset gap X. It is seen that the resultant image is out of focus because it is only focused in a different plane than that of the image receiving surface 82. FIG. 3B shows the situation when $2 \cdot P \cdot F_N$ is larger than X, where it is seen that the resultant image is in focus in the same different plane as the image receiving surface 82. FIG. 3C shows the situation when X=zero, and then of course $2 \cdot P \cdot F_N$ is greater than X. It is seen that the resultant image is in focus and in the same plane as the image receiving surface 82.

By selecting the dimension P of each pixel of the image sensor 80 in relation to the aperture number $F_N$, such that $2 \cdot P \cdot F_N \geq X$, the problem of slightly different spacings between the focusing center of the lens 58 and the image receiving surface 82 of the image sensor 80 which cause the focus offset gap X can be automatically compensated. The dimension of a pixel 84 can be for example, the width of a square pixel, the smallest width of a rectangular pixel, or the diameter of a round pixel. A suitable size for pixel dimension P can be, for example, from about 1 to about 5 microns.

In this manner, the imaging device 50 can be designed to compensate for inherent mechanical or machining tolerances of the imaging device 50. These tolerances may be caused, for example, by machining variations due to wear-out of tools, variations in the position of the component during the machining process, variations in or the thickness of the spacing materials between the lens 58 and the sensor 80. All of these, and other factors, can cause variability in the distance of the spacing S between the optical center C of the lens 58 and the image receiving surface 82 which contributes to the focus offset gap X.

As one example, the focus offset gap X can be caused by variability in the thickness of an adhesive, T, which is used to bond the lens 58 to the spacer plate 64. For example, as shown in FIG. 2, each lens 58 has an outer circumference 90 which extends beyond a diameter of the lens opening 60 to provide a suitable attachment region. The lenses 58 are attached at their outer circumference 90 to the spacer plate 64 with an adhesive 92, such as an epoxy glue or cyanoacrylate glue. The adhesive 92 can also include an opaque filler such as carbon powder. The adhesive 92 can be sprayed onto the surface of the spacer plate 64 before the lenses 58 are inserted into the lens openings to further facilitate assembly. The focus offset gap X may even be caused entirely by the thickness of the adhesive T, or X maybe equal to T.

Figure 4:
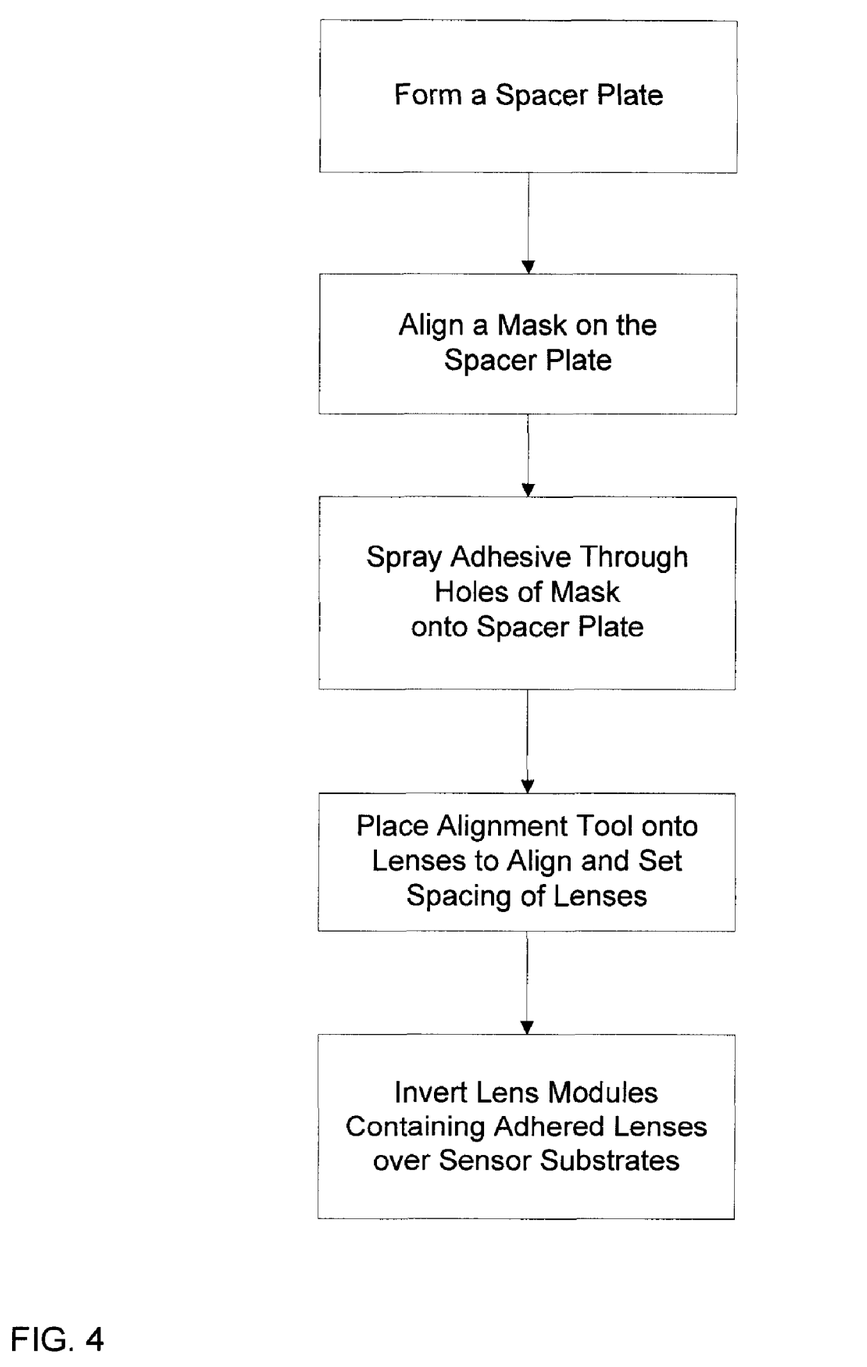
FIG. 4 is a flow chart of a method of fabricating imaging devices.

An embodiment of a process of fabricating an imaging device, usually by simultaneously fabricating an array of such devices at the same time, is illustrated in FIG. 4. A spacer plate 64 which provides the spacing distance S that separates the lens 58 from the image sensor 80, as shown in FIG. 2, is made from a dielectric, semiconductor or conductor material, which has a sufficient mechanical strength to support a lens 58. Suitable materials include, for example: glass such as silicate or borosilicate glass; ceramic such as aluminum oxide or silicon dioxide; metal such as titanium and stainless steel; or even polymers such as plastic or polyimide and heat-resistant plastic. Also, when the lenses 58 and spacer plate 64 are both made from glass, they provide a better thermal expansion match. The spacer plate 64 can be a unitary plate or a number of separate plates that are joined to one another by an adhesive to form the spacer plate 64, as for example, described in common assigned U.S. patent application Ser. No. 11/925,742, entitled "Image Capturing Unit and Methods", filed on Oct. 26, 2007, which is incorporated by reference herein and in its entirety.

Figure 5A:
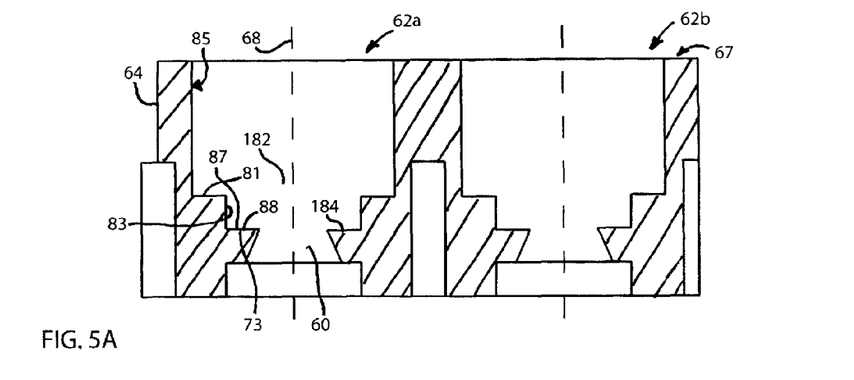
FIGS. 5A to 5E schematic sectional side views showing steps in the fabrication of an imaging device including: (i) a spacer plate having lens barrels with lens openings and sensor cavities (FIG. 5A); (ii) adhesive applied through mask openings of a mask that shields the sidewalls of the lens barrel (FIG. 5B); (iii) inserting a lens in each sensor cavity to contact a lens opening (FIG. 5C); (iv) inserting the alignment prongs of an alignment tool into the sensor cavity to align the lenses in the lens openings (FIG. 5D), and (v) removing the alignment tool, flipping over the lens module array, and aligning each lens barrel to an image sensor on a substrate (FIG. 5E).

An embodiment of a spacer plate 64 having a first surface 61 and a second surface 67 and an array of lens barrels 62 is shown in FIG. 5A. The lens barrels 62 of the spacer plate 64 can be formed by a number of different methods. A mechanical or laser drill can be used to drill the through holes through the spacer plate 64. A suitable laser comprises a $CO_2$ or pulsed laser, such as Nd:YAG laser or excimer laser. The spacer plate 64 can also be fabricated by wet or dry etching the spacer plate 64 (or plates) to form the through holes. When the spacer plate 64 is made of glass, the lens barrels 62 can also be made by etching the glass by sandblasting through a metal mask that has apertures corresponding to the diameters of the lens opening 60 and sensor cavity 66. Instead of sandblasting, ultrasonic etching can also be used.

In one method, the lens opening 60 and sensor cavity 66 are both formed by drilling or etching the spacer plate 64 separately from both the first surface 61 and second surface 67 to predefined depths that correspond to the depths of the lens opening 60 or sensor cavity 66, respectively. For example, a plurality of lens openings 60 can be drilled from the first surface 61 to a first diameter and first depth. Thereafter, a plurality of sensor cavities 66 are drilled from the second surface 67 to a second diameter and second depth. Typically, the second diameter is larger than the first diameter, so that the circumference of the sensor cavity 66 extends radially beyond the circumference of the lens opening 60. The first diameter depends on the selected diameter of a lens 58 that is positioned in the lens openings 60. In one example, the second diameter is larger than the first diameter by at least about 10%, or even by about 30%. For example, the first diameter can be from about 0.5 mm to about 2.7 mm, and the second diameter can be from about 0.6 mm to about 3.0 mm. These different diameters reduce the lens opening to the minimum necessary for the light to reach the image sensor 80, and thus, provide better mechanical strength for the spacer plate 64.

Each lens barrel 62 comprises a lens opening 60 that extends inward from the first surface 61 of the spacer plate 64. The portion of the lens opening 60 that is in contact with a lens 58 is also coated with an opaque coating which is opaque to light. The lens barrel 62 comprises a sidewall 85 having a complex multi-step profile which includes a first step 81 with a flange 87 to support a lens 58. When lenses 58 are inserted into the lens barrels they contact a sidewall 83 of the first step 81 and rest on the flange 87. The step sidewalls 83 each define a radially inner surface that can be a cylindrical, curved or conical shape. The radially inner surface can also be shaped to match or fit the outer perimeters of lenses 58.

In one version, shown for example in FIG. 2, the sidewall 85 of the lens opening comprises an inclined surface that extends downwardly and outwardly from the lens. For example, sidewall 85 can comprise a portion that is inclined away from the orifice 182 at an angle selected such that a light ray at maximum angle of light incident on the lens 58 does not touch the sidewall 85 of the lens opening 60. A suitable conical flange is sloped at an angle relative to the central axis 68 of the lens barrel 62. The inclined surface can gradually taper outward, creating an internal profile contour having at least two consecutive diameters with a first portion having a first diameter and a second portion having a second diameter that is larger than the first diameter, or vice versa. In one version, the inclined conical surface comprises a slope of from about 2 to about 30 degrees.

Figure 5B:
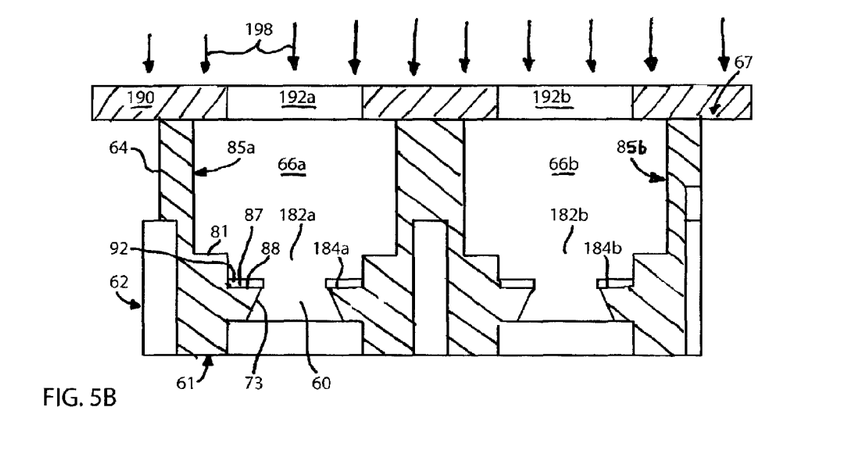
Figure 5C:
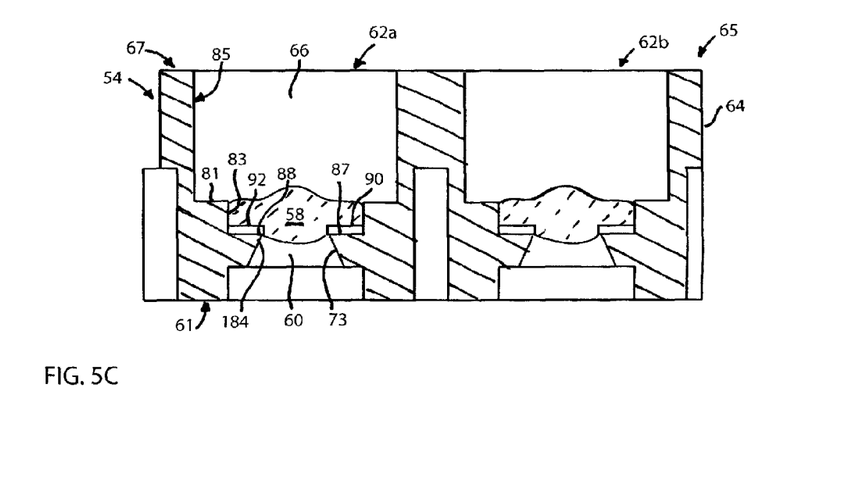

In FIG. 5A-5C, the lens opening 60 comprises a conical portion 73 having an angle of inclination of from about 2 to about 45 degrees. The conical portion 73 is angled to extend upward and outward from the orifice 182, for example, by having an angle of inclination that is selected in relation to the properties of the lens 58, the size of the sensor (not shown), the spacing between the lens and the sensor, or combinations thereof. For example, the angle of inclination of the conical portion 73 of the sidewalls 85 can be selected such that a light ray that is incident on the lens 58 at the angle of inclination will be bent by the lens 58 sufficiently far to fall on the sensor. In some lens configurations, the conical portions 73 of the sidewalls 85 can even allow the light collected by the lenses 58 to be collected from a wider solid angle as compared to a cylindrical sidewall.

The profile of the flange 87 (not shown) can also match an outer contour of a lens 58 to allow self-alignment of a lens 58 inserted into the lens barrel 62. For example, a suitable profile shape for the first step 81 can be a curved or conical shape having a radius of curvature which fits the shape determined by the desired optical properties of the lens 58. The curvature can be generated by molding the lens opening 60 to have the desired shape of the sidewall 85 when this spacer plate 64 is made from a polymeric material, such as plastic; or by mechanical or ultrasonic etching when the spacer plate 64 is made from glass.

After the lens barrels 62 are completed, an anti-reflective coating 89 (shown in FIG. 2) can be deposited or formed on the sidewall 85 of each lens barrel 62. A suitable anti-reflective coating 89 comprises a layer, or a stack of layers of light absorbing material. The anti-reflective coating 89 can be applied by vapor deposition, spray painting, sputtering, or by oxidation of the surface of the material. The anti-reflective coating 89 can be formed to a thickness of at least about 50 microns, or even a thickness of from about 1 micron to about 100 microns.

An embodiment of a process of fabricating an array of image capturing units is shown in FIGS. 5A to 5E. An adhesive 92 is applied to the support surface of flange 87 of the lens opening 60 to adhere the lens 58 which is placed in contact with the support surface 88 of the flange 87, as shown in FIG. 5B. In one method of applying the adhesive 92, a mask 190 is placed on the second surface 67 of the spacer plate 64 to mask the sidewalls 85*a,b* of the sensor cavities 66*a,b*. The mask 190 has holes 192*a,b* which are arranged in a periodic relationship that corresponds to the lens spacing of the lens opening 60. A suitable mask 190 can be made from aluminum. Adhesive 198 is sprayed through the mask holes 192*a,b* of the mask 190 to form the adhesive 92 on the support surface 88 of the flange 87 and on the circumferential edges 184*a,b* of the orifices 182*a,b*.

Figure 5D:
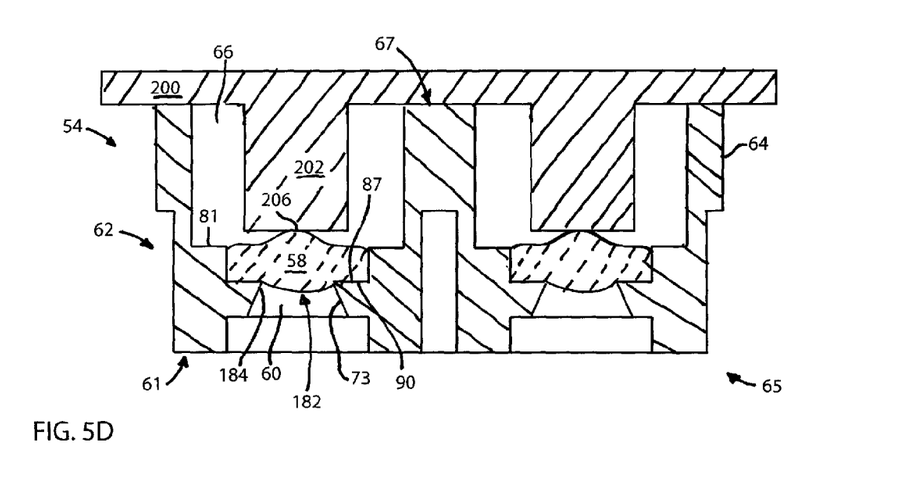
Figure 5E:
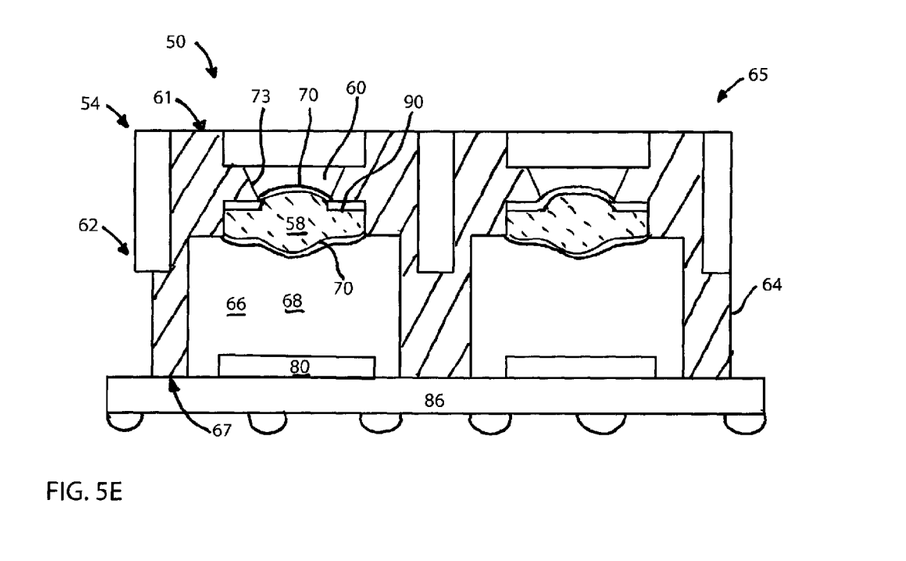

Thereafter, a lens 58 is inserted in each sensor cavity 66 as shown in FIG. 5C, so that an outer circumference 90 of the lens 58 rests on the adhesive 92 in this region. An alignment tool 200 comprises alignment prongs 202 that are inserted into the sensor cavity 66 to align the lens 58 in the orifice 182 as shown in FIG. 5D. The alignment prongs 202 are separated from one another by the lens spacing distance. The alignment tool 200 can be made from a metal and, in one version, can have from about 100 to about 5000 prongs. The length of the alignment prongs 202 corresponds to the distance between an apex 206 of the lens 58 and the second surface 67 of the spacer plate 64 to set the distance between the second surface 67 and the apex 206 of the lens 58 to the proper length. In one version, each of the prongs 202 comprises a length of from about 0.5 to about 5 mm The alignment tool 200 is then removed from the spacer plate 64 to form a lens module array 65 comprising lens modules 54 that each comprise a lens 58 adhered to an orifice of a lens opening 60 of a lens barrel 62 of the spacer plate 64. The lens module array 65 is flipped over and each lens module 54 is aligned to an image sensor 80 of an image sensor array 150 on a sensor substrate 86 as shown in FIG. 5E. The lens module array 65 can be adhered to the sensor substrate 86 such that each lens barrel 62 is attached to a sensor 80 or to the sensor substrate 86 with an adhesive. The adhesive between the lens barrel 62 and the sensor 80 can have a thickness of from about 0.1 to about 10 microns. Each lens 58 can also have an anti-reflective coating 70, such as an infrared reflective coating, as previously described. A lens cover plate 180 can be used to protect the underlying lens 58, as shown in FIG. 2. The lens cover plate 180 is substantially permeable to radiation, such as optical wavelengths of light, or other types of radiation. For example, the lens cover plate 180 can allow at least 90% of normally incident light to pass through. In one version, the lens cover plate 180 reduces moisture or dust contamination of the lenses 58. The lens cover plate 180 can be a plate of light-permeable material, for example, glass or plastic. The lens cover plate 180 can also serve as a radiation filter, such as an infrared filter which absorbs at least about 90% of radiation having wavelengths in the infrared range. The resultant assembly can be diced to form individual imaging devices 50. Suitable cutting processes include mechanical cutting, laser cutting or electrical discharge machining. The imaging device 50 formed by a lens module 54 containing one or more lenses 58, and an image sensor 80 on an image sensor substrate 86 which are aligned to have a common axis can be used in a variety of different devices.

While illustrative embodiments of the spacer plate 64, lens barrel 62 and imaging device 50 are described in the present application, it should be understood that other embodiments are also possible. For example, other designs for the lens barrel 62 and spacer plate 64 can be used. Also, the lens module 54 can be packaged with other types of image-capturing modules, depending on the application. Thus, the scope of the claims should not be limited to the illustrative embodiments described herein.

What is claimed is:

1. An imaging device capable of automatically compensating for a focus offset gap, the imaging device comprising:
   (a) a lens barrel having a lens opening;
   (b) a lens positioned in the lens opening of the lens barrel, the lens having an optical center, a focal length F, an aperture diameter D, and an aperture number $F_N=F/D$; and
   (c) an image sensor comprising an array of light-sensing pixels that each have a dimension P, the image receiving surface of the sensor being spaced apart a distance S from the optical center of the lens, and
   wherein a focus offset gap $X=F-S$ has a positive or negative value, and
   wherein P and $F_N$ are selected such that $2 \cdot P \cdot F_N \geq |X|$ to automatically compensate for the focus offset gap.

2. A device according to claim 1 wherein the lens comprises an aperture number $F_N$ of less than 22.

3. A device according to claim 1 wherein the lens comprises an aperture number $F_N$ of about 1.

4. A device according to claim 1 wherein the lens comprises a focal length F of from about 0.5 to about 10 mm.

5. A device according to claim 1 wherein the lens comprises an aperture diameter D of from about 0.5 to about 10 mm.

6. A device according to claim 1 wherein the dimension P of the light-sensing pixel is from about 1 to about 5 microns.

7. A device according to claim 1 wherein each barrel is attached to the sensor or to the substrate holding the sensor with an adhesive.

8. A device according to claim 7 wherein the adhesive comprises a thickness T that contributes to the focus offset gap X.

9. An imaging device capable of automatically compensating for a focus offset gap, the imaging device comprising:
   (a) a housing comprising a lens barrel having a lens opening, the lens opening having a circumferential edge;
   (b) a lens having focal length F positioned in the lens opening of the lens barrel, the optical center of the lens being positioned at a spacing S away from an image sensor, the focal length F and spacing S defining a focus offset gap X such that $X=F-S$, wherein X has a positive or negative value, and the lens barrel comprising an outer circumference and an aperture number $F_N$;
   (c) an adhesive to adhere the outer circumference of the lens to the circumferential edge of the lens opening, the adhesive having a thickness T that contributes to the focus offset gap X; and
   (d) an image sensor comprising an array of light-sensing pixels that each have a dimension P such that $2 \cdot P \cdot F_N \geq |X|$ to automatically compensate for the focus offset gap.

10. A device according to claim 9 wherein the lens comprises an aperture number $F_N$ of less than 22.

11. A device according to claim 10 wherein the lens comprises a focal length F of from about 0.5 to about 10 mm and an aperture diameter D of from about 0.5 to about 10 mm.

12. A device according to claim 9 wherein the dimension P of the light-sensing pixel is from about 1 to about 5 microns.

13. A device according to claim 9 wherein the adhesive between the lens barrel and the image sensor comprises a thickness of from about 0.1 to about 10 microns.

14. A method of forming an imaging device capable of automatically compensating for a focus offset gap, the method comprising:

(a) providing a lens barrel having a lens opening;
(b) positioning a lens in the lens opening of the lens barrel, the lens having a focal length F, an aperture diameter D, and an aperture number $F_N = F/D$;
(c) placing an image sensor at a distance S from the optical center of the lens such that a focus offset gap $X = F - S$, whereby X has a positive or negative value, the sensor comprising an array of light-sensing pixels that each have a dimension P; and
(d) selecting the dimension P of the light-sensing pixels and the aperture number $F_N$ of the lens such that $2 \cdot P \cdot F_N \geq |X|$ to automatically compensate for the focus offset gap.

15. A method according to claim 14 wherein (b) comprises selecting a lens comprising an aperture number $F_N$ of less than 22.

16. A method according to claim 14 wherein (b) comprises selecting a lens comprising a focal length F of from about 0.5 to about 10 mm, and setting an aperture diameter D of from about 0.5 to about 10 mm.

17. A method according to claim 14 wherein (c) comprises selecting an image sensor having light-sensing pixels having a dimension P of from about 1 to about 5 microns.

* * * * *